United States Patent
Takeda

(10) Patent No.: US 10,897,046 B2
(45) Date of Patent: Jan. 19, 2021

(54) NEGATIVE ELECTRODE FOR LITHIUM ION SECONDARY CELL, LITHIUM ION SECONDARY CELL, AND METHOD FOR PRODUCING LITHIUM ION SECONDARY CELL

(71) Applicant: TOYOTA JIDOSHA KABUSHIKI KAISHA, Toyota (JP)

(72) Inventor: Kazuhisa Takeda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 88 days.

(21) Appl. No.: 16/113,006

(22) Filed: Aug. 27, 2018

(65) Prior Publication Data

US 2019/0081326 A1    Mar. 14, 2019

(30) Foreign Application Priority Data

Sep. 13, 2017 (JP) .................................. 2017-175976

(51) Int. Cl.
*H01M 4/04* (2006.01)
*H01M 4/1393* (2010.01)
(Continued)

(52) U.S. Cl.
CPC .......... *H01M 4/628* (2013.01); *H01M 4/0404* (2013.01); *H01M 4/0471* (2013.01); *H01M 4/139* (2013.01); *H01M 4/1393* (2013.01); *H01M 4/366* (2013.01); *H01M 10/058* (2013.01); *H01M 10/0525* (2013.01);
(Continued)

(58) Field of Classification Search
CPC .. H01M 4/0404; H01M 4/0471; H01M 4/139; H01M 4/1393; H01M 4/366; H01M 4/587; H01M 4/628; H01M 2004/027; H01M 10/0525; H01M 10/058; H01M 10/4235
See application file for complete search history.

(56) References Cited

U.S. PATENT DOCUMENTS

2018/0351157 A1* 12/2018 Kendrick ................ H01M 4/62

FOREIGN PATENT DOCUMENTS

| JP | 2010-129430 A | 6/2010 |
| JP | 2013-089320 | * 5/2013 |

(Continued)

*Primary Examiner* — Brittany L Raymond
(74) *Attorney, Agent, or Firm* — Sughrue Mion, PLLC

(57) ABSTRACT

A technique of preventing the formation of dendritic Li metal on a negative electrode active material surface and suppressing a reduction in cell capacity. In the negative electrode for a lithium ion secondary cell, a negative electrode mixture layer including a negative electrode active material is formed on a foil-shaped negative electrode current collector surface, ion exchange particles that adsorb transition metal ions and release prescribed cations are included in the negative electrode mixture layer, and gold and/or platinum is present in the ion exchange particles. As a result, a large number of metal nanoparticles derived from cations of Au (or Pt) released from the ion exchange particles attach to the negative electrode active material. Since layered Li metal can be easily formed using such metal nanoparticles as metal nuclei, formation of dendritic Li metal is prevented and a reduction in cell capacity can be suppressed.

20 Claims, 7 Drawing Sheets

(51) Int. Cl.
*H01M 4/62* (2006.01)
*H01M 10/0525* (2010.01)
*H01M 10/058* (2010.01)
*H01M 4/36* (2006.01)
*H01M 10/42* (2006.01)
*H01M 4/139* (2010.01)
*H01M 4/587* (2010.01)
*H01M 4/02* (2006.01)

(52) U.S. Cl.
CPC ........ *H01M 10/4235* (2013.01); *H01M 4/587* (2013.01); *H01M 2004/027* (2013.01)

(56) References Cited

FOREIGN PATENT DOCUMENTS

| | | |
|---|---|---|
| JP | 2013-089320 A | 5/2013 |
| JP | 2015-056208 A | 3/2015 |

* cited by examiner

NEGATIVE ELECTRODE FOR LITHIUM ION SECONDARY CELL, LITHIUM ION SECONDARY CELL, AND METHOD FOR PRODUCING LITHIUM ION SECONDARY CELL

CROSS REFERENCE TO RELATED APPLICATIONS

This application claims priority from Japanese Patent Application No. 2017-175976 filed on Sep. 13, 2017, the entire contents of which are incorporated herein by reference.

BACKGROUND OF THE INVENTION

1. Field of the Invention

The present invention relates to a lithium ion secondary cell. More specifically, the present invention relates to a negative electrode for use in a lithium ion secondary cell, a lithium ion secondary cell using the negative electrode, and a method for producing a lithium ion secondary cell.

2. Description of the Related Art

In recent years, secondary cells such as lithium ion secondary cells and nickel-hydrogen cells have been preferably used as so-called portable power sources for personal computers, portable terminals and the like, and power sources for driving vehicles. In particular, lithium ion secondary cells that are lightweight and capable of obtaining high energy density are important as high-output power sources (for example, power sources for driving a motor connected to drive wheels of a vehicle) used in vehicles such as electric vehicles and hybrid vehicles.

A positive electrode of such a lithium ion secondary cell is formed by coating a positive electrode mixture layer on the surface of a foil-shaped positive electrode current collector. The positive electrode mixture layer includes a particulate positive electrode active material. For example, a lithium transition metal complex oxide including a lithium element and a transition metal element or the like is used for the positive electrode active material.

Meanwhile, a negative electrode is formed by coating a negative electrode mixture layer on the surface of a foil-shaped negative electrode current collector. Like the positive electrode, the negative electrode mixture layer also includes an active material (negative electrode active material). For example, a carbon material such as graphite is used for this negative electrode active material.

An example of such a lithium ion secondary cell is disclosed in Japanese Patent Application Publication No. 2015-56208. This document describes a technique of forming a protective layer including an inorganic compound on an active material layer (a mixture layer). In this document, $Al_2O_3$, $SiO_2$, $TiO_2$, $ZrO_2$, talc, zeolites and the like are mentioned as inorganic compounds contained in the protective layer. In such a technique, a metal (manganese or the like) which is a metal eluted from the positive electrode active material into an electrolytic solution and not directly related to the operation of the cell is trapped by the protective layer.

Further, Japanese Patent Application Publication No. 2010-129430 discloses a technique of including a zeolite in a positive electrode. As a result, metal ions eluted from the positive electrode active material can be adsorbed by the zeolite in the positive electrode, so that occurrence of capacity deterioration due to adhesion of metal ions to the carbon material of the negative electrode can be suppressed.

SUMMARY OF THE INVENTION

Meanwhile, when the above-described lithium ion secondary cell is charged, lithium eluted from the positive electrode active material sometimes precipitates on the surface of the negative electrode active material to form Li metal. Such Li metal is dissolved in the electrolytic solution again as a result of discharging or when the cell is allowed to stand for a long time, so it is generally considered that the possibility of the Li metal significantly affecting the cell capacity is low.

However, as shown in FIG. 5A, a Li metal 104 formed during charging sometimes grows like a dendrite from the surface of a negative electrode active material 102.

Since the dendritic Li metal 104 is conductively connected to the negative electrode active material 102 in a root portion 104a, as shown in FIG. 5B, there is a possibility that only the root portion 104a be dissolved in the electrolytic solution when discharging or the like is performed. In this case, since the conduction between the Li metal 104 and the negative electrode active material 102 is broken, most of the Li metal 104 remains undissolved. Where the amount of such undissolved Li metal 104 is increased, the number of lithium ions contributing to the charge and discharge reaction is reduced, which causes a large reduction in cell capacity.

The present invention is accomplished with the foregoing in view, and it is a main object thereof to provide a technique for preventing the formation of dendritic Li metal during charging and suitably suppressing a reduction in cell capacity.

In order to achieve the abovementioned object, there is provided, as one aspect of the present invention, a negative electrode for a lithium ion secondary cell (hereinafter also simply referred to as "negative electrode") having the following configuration.

In the negative electrode for a lithium ion secondary cell disclosed herein, a negative electrode mixture layer including a negative electrode active material is formed on the surface of a foil-shaped negative electrode current collector. In such a negative electrode, the negative electrode mixture layer includes ion exchange particles that adsorb transition metal ions to release predetermined cations, and at least one of gold (Au) and platinum (Pt) is present in the ion exchange particles.

In order to solve the abovementioned problems, the inventors of the present invention first studied the cause of formation of the dendritic Li metal on the surface of the negative electrode active material and found the following.

In the case where Li metal is formed on the surface of the negative electrode active material, fine Li metal particles (metal nanoparticles of Li) are initially attached to the surface of the negative electrode active material. Then, the Li metal grows by sequential precipitation of Li metal around the metal nanoparticles serving as metal nuclei.

At this time, where a large number of metal nanoparticles are attached to the surface of the negative electrode active material and the distance between the metal nanoparticles is narrowed, the adjacent portions of Li metal grow while being bonded to each other, so that a layered Li metal is formed to cover the surface the negative electrode active material. Since such a layered Li metal is conductively connected to the negative electrode active material in a wide range, the Li metal is easily dissolved during discharge or the like.

Meanwhile, when the number of metal nanoparticles on the surface of the negative electrode active material is reduced and the distance between the particles is increased, the adjacent portions of Li metal tend to grow toward the outside in the radial direction of the negative electrode active material particles, without being bonded to each other. As a result, a dendritic Li metal such as shown in FIG. 5A is formed.

Based on this finding, the inventors of the present invention have concluded that where a large number of metal nanoparticles can be attached to the surface of a negative electrode active material before the Li metal precipitates and grows, the Li metal is likely to grow in a layer shape, so that the formation of dendritic Li metal can be prevented and a reduction in cell capacity can be suitably suppressed.

However, where a lithium ion secondary cell is constructed simply by preparing a negative electrode active material supporting metal nanoparticles and using a negative electrode including the negative electrode active material, dendritic Li metal is sometimes formed in spite of the attachment of a large number of metal nanoparticles to the surface of the negative electrode active material.

As a result of investigating the cause of this effect, it was found that in a typical lithium ion secondary cell, transition metal ions are eluted from the positive electrode active material and this transition metal may precipitate on the surface of the negative electrode active material, and where the metal nanoparticles are covered by the transition metal, the metal nanoparticles do not function as metal nuclei for Li metal growth, and formation of dendritic Li metal cannot be prevented.

Therefore, the inventors of the present invention considered adding ion exchange particles (such as a zeolite) that adsorb transition metal ions to the negative electrode mixture layer to prevent precipitation of the transition metal.

Here, the inventors of the present invention considered forming suitable metal nanoparticles on the surface of the negative electrode active material by utilizing the characteristics of the ion exchange particles used for adsorbing transition metal ions.

Specifically, ordinary, ion exchange particles have a non-skeletal element such as Na and release cations of such a non-skeletal element when adsorbing transition metal ions.

The inventors of the present invention focused on such characteristics and found that where a cation released from the ion exchange particles is a cation of a metal that can be a metal nucleus for the Li metal, a large number of metal nanoparticles suitable as metal nuclei can be attached to the surface of the negative electrode active material.

As a result of further investigation, it was found that a cation of a metal having an underpotential precipitation action such as gold (Au) or platinum (Pt) is suitable as a cation to be released from the ion exchange particles. Specifically, since a metal having an underpotential precipitation action precipitates at a potential nobler than that of lithium, a large number of nanoparticles of gold (Au) or platinum (Pt) can be attached to the surface of the negative electrode active material before the precipitation of Li metal. In this case, the Li metal precipitates on the precipitated metal nanoparticles at a nobler potential than usual. As a result, it is possible to grow the Li metal in a layered manner, while binding together the portions of the Li metal, by using the metal nanoparticle as starting points.

The negative electrode for a lithium ion secondary cell disclosed herein is based on the above findings, and in this negative electrode, ion exchange particles that adsorb transition metal ions and release prescribed cations are included in the negative electrode mixture layer, and at least one of gold (Au) and platinum (Pt) is present in the ion exchange particles.

When a lithium ion secondary cell is constructed using such a negative electrode, transition metal ions eluted from the positive electrode active material are adsorbed to the ion exchange particles, and cations of Au (or Pt) are released from the ion exchange particles. Then, such Au (or Pt) precipitates in large quantities in a state of metal nanoparticles which are attached to the surface of the negative electrode active material before the precipitation of Li metal. Therefore, by using the negative electrode disclosed herein, it is possible to obtain a lithium ion secondary cell in which a large number of metal nanoparticles are attached to the surface of the negative electrode active material. In such a lithium ion secondary cell, Li metal is precipitated on the metal nanoparticles of Au (or Pt) at a nobler potential than usual, and Li metal grows, while portions thereof are bonded to each other, with the metal nanoparticles as starting points. As a result, since layered Li metal can be easily formed on the surface of the negative electrode active material, it is possible to prevent the generation of dendritic Li metal and favorably suppress a reduction in cell capacity.

In one preferred aspect of the negative electrode for a lithium ion secondary cell disclosed herein, the ion exchange particles are any of zeolite, kaolinite, halloysite, illite, and montmorillonite.

Since these mineral materials have a suitable ion exchange capacity, the transition metal ions eluted from the positive electrode active material can be adequately adsorbed and ions of Au (or Pt) can be adequately released. Therefore, it is possible to form a large number of metal nanoparticles suitable as metal nuclei on the surface of the negative electrode active material, thereby suitably preventing the formation of dendritic Li metal.

In another preferred aspect of the negative electrode for a lithium ion secondary cell disclosed herein, the ion exchange particles are supported on the surface of the negative electrode active material.

Where the ion exchange particles are disposed at positions distant from the surface of the negative electrode active material, when the Au (or Pt) particles precipitate, the particles are unlikely to be uniformly attached to the surface of the negative electrode active material, and agglomerates and dendrites may be formed. Meanwhile, where the ion exchange particles are supported on the surface of the negative electrode active material, the ion exchange particles are arranged at positions close to the surface of the negative electrode active material. Therefore, metal nanoparticles of Au (or Pt) can be suitably attached to the surface of the negative electrode active material.

In another preferred aspect of the negative electrode for a lithium ion secondary cell disclosed herein, the ion exchange particles have an average particle diameter of 50 nm or more and 300 nm or less.

By using such nanosize ion exchange particles, the surface area of all the ion exchange particles included in the negative electrode mixture layer can be increased. As a result, transition metal ions eluted from the positive electrode active material can be adsorbed more suitably, and metal nanoparticles of Au (or Pt) having a sufficiently small particle diameter can be suitably formed.

In the present specification, the term "average particle diameter" is assumed to refer to the arithmetic mean value of an equivalent diameter of 100 or more particles selected from a plurality of (for example, two or more) observation fields when observing particles to be observed by observation means such as an electron microscope.

In another preferred aspect of the negative electrode for a lithium ion secondary cell disclosed herein, when the weight of the negative electrode mixture layer excluding the ion exchange particles is taken as 100 wt %, the weight of the ion exchange particles is 1 wt % to 10 wt %.

In order to suitably attach Au (or Pt) metal nanoparticles to the surface of the negative electrode active material, it is preferable that an appropriate amount of ion exchange particles be added to the negative electrode mixture layer. The addition amount of the ion exchange particles at this time can be set, for example, within the numerical range described above.

As another aspect of the present invention, a lithium ion secondary cell having the following configuration is provided.

A lithium ion secondary cell discloses herein comprises a positive electrode in which a positive electrode mixture layer including a positive electrode active material is formed on a surface of a foil-shaped positive electrode current collector, and a negative electrode in which a negative electrode mixture layer including a negative electrode active material is formed on a surface of a foil-shaped negative electrode current collector.

In the lithium ion secondary cell, the positive electrode active material is a lithium transition metal complex oxide, ion exchange particles that adsorb transition metal ions and release prescribed cations are included in the negative electrode mixture layer, and a plurality of metal nanoparticles including at least one of gold (Au) and platinum (Pt) are attached to the surface of the negative electrode active material.

In the lithium ion secondary cell disclosed herein, the negative electrode for a lithium ion secondary cell according to the abovementioned aspects is used. The negative electrode mixture layer of the negative electrode includes ion exchange particles in which Au (or Pt) is present. Such ion exchange particles adsorb the transition metal ions eluted from the positive electrode active material and release cations of Au (or Pt).

Since Au (or Pt) has an underpotential precipitation action, the Au (or Pt) precipitates at a nobler potential than Li and attaches to the surface of the negative electrode active material.

Therefore, in the lithium ion secondary cell disclosed herein, a plurality of metal nanoparticles including at least one of gold (Au) and platinum (Pt) are attached to the surface of the negative electrode active material. As a result, Li metal precipitates on such metal nanoparticles at a nobler potential than usual and the Li metal grows while portions thereof are bonded to each other. Therefore, a layered Li metal such that covers the surface of the negative electrode active material is likely to be grown. As a result, generation of dendritic Li metal can be prevented, and a reduction in cell capacity can be suitably suppressed.

In one preferred aspect of the lithium ion secondary cell disclosed herein, one of gold (Au) and platinum (Pt) is present in the ion exchange particles.

As described above, in the lithium ion secondary cell using the negative electrode according to the above-described aspect, the cations of Au (or Pt) are released from the ion exchange particles, and the metal nanoparticles derived from the released cations are attached to the surface of the negative electrode active material. However, it is not necessary for the entire Au (or Pt) present in the ion exchange particles to be released as cations, and some Au (or Pt) may remain in the ion exchange particles. Therefore, in the lithium ion secondary cell disclosed herein, either gold (Au) or platinum (Pt) can also be present in the ion exchange particles.

In another preferred aspect of the lithium ion secondary cell disclosed herein, the metal nanoparticles have an average particle diameter of 2 nm to 3 nm.

Layered Li metal can be easily formed by attaching a large number of such fine metal nanoparticles to the surface of the negative electrode active material, so that the generation of dendritic Li metal can be suitably prevented.

According to another aspect of the present invention, there is provided a method for producing a lithium ion secondary cell (hereinafter also simply referred to as "production method") having the following configuration.

The production method disclosed herein is a method for producing a lithium ion secondary cell comprising a positive electrode in which a positive electrode mixture layer including a positive electrode active material is formed on a surface of a foil-shaped positive electrode current collector, and a negative electrode in which a negative electrode mixture layer including a negative electrode active material is formed on a surface of a foil-shaped negative electrode current collector.

This production method includes: a paste preparation step of preparing a negative electrode mixture paste including ion exchange particles in which at least one of gold (Au) and platinum (Pt) is present, and the negative electrode active material; a negative electrode preparation step of preparing a negative electrode in which the negative electrode mixture layer is formed on the surface of the negative electrode current collector by coating the negative electrode mixture paste on the surface of the negative electrode current collector and drying the negative electrode mixture paste; a sealing step of accommodating the negative electrode and the positive electrode together with a predetermined electrolytic solution in a case and sealing the case; and a metal nanoparticle formation step of attaching a plurality of metal nanoparticles to the surface of the negative electrode active material by releasing cations of at least one of the gold (Au) and platinum (Pt) from the ion exchange particles included in the negative electrode mixture layer.

The production method disclosed herein is a method for preparing the negative electrode for a lithium ion secondary cell according to the above-described aspects and producing a lithium ion secondary cell by using the negative electrode.

In this production method, ion exchange particles in which at least one of gold (Au) and platinum (Pt) is present is added in the paste preparation step. As a result, in the metal nanoparticle formation step, cations of Au (or Pt) are released from the ion exchange particles, and a large number of metal nanoparticles including Au (or Pt) can be attached to the surface of the negative electrode active material.

In the lithium ion secondary cell thus obtained, it is possible to form a layered Li metal that covers the surface of the negative electrode active material when Li metal is precipitated. Therefore, a reduction of cell capacity can be suppressed.

In a preferred aspect of the production method disclosed herein, in the paste preparation step, the ion exchange particles are supported on the surface of the negative electrode active material by mixing the ion exchange particles and the negative electrode active material and subjecting the mixed material to ball mill treatment.

As described above, where the ion exchange particles are supported on the surface of the negative electrode active material, the ion exchange particles are disposed at positions close to the surface of the negative electrode active material. Therefore, it is possible to suitably attach the Au (or Pt) metal nanoparticles to the surface of the negative electrode active material. One method for obtaining such negative electrode active material on which ion exchange particles are supported is ball mill treatment.

In another preferable aspect of the production method disclosed herein, in the metal nanoparticle formation step, a plurality of metal nanoparticles are attached to the surface of the negative electrode active material by performing aging treatment at a temperature of 50° C. to 70° C. in a fully charged state.

By performing the aging treatment under a high temperature environment as described above, sufficient amount of transition metal ions can be adsorbed on the ion exchange particles and the cations of Au (or Pt) can be adequately released. As a result, metal nanoparticles of Au (or Pt) can be suitably formed on the surface of the negative electrode active material.

DETAILED DESCRIPTION OF THE PREFERRED EMBODIMENTS

Figure 1:
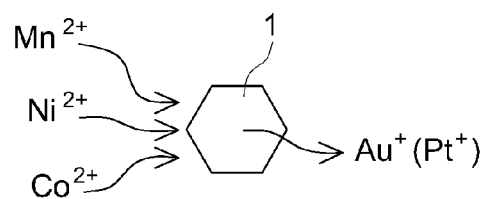
FIG. 1 is a diagram schematically showing ion exchange particles used in a negative electrode for a lithium ion secondary cell according to one embodiment of the present invention.

Hereinafter, embodiments of the present invention will be described with reference to the drawings.

In the present specification, the term "lithium ion secondary cell" refers to a secondary cell in which lithium ions are used as electrolyte ions and charge and discharge is realized by charge transfer accompanying lithium ions between positive and negative electrodes. A secondary cell generally referred to as a lithium secondary cell (or lithium ion cell) or the like is a typical example included in the definition of the lithium ion secondary cell in the present specification. Further, in the present specification, the term "active material" refers to a substance (compound) involved in electricity storage on the positive electrode side or the negative electrode side. That is, the active material refers to substances involved in occlusion and release of electrons during charging and discharging of the cell.

1. Negative Electrode for Lithium Ion Secondary Cell

First, a negative electrode for a lithium ion secondary cell will be described as an embodiment of the present invention.

A negative electrode 20 (see FIG. 4) for a lithium ion secondary cell according to the present embodiment includes a foil-shaped negative electrode current collector 22 and a negative electrode mixture layer 24 including a negative electrode active material, and the negative electrode mixture layer 24 is formed on the surface of the negative electrode current collector 22.

(1) Negative Electrode Current Collector

The negative electrode current collector 22 is a foil-shaped conductive member. The structure and material that can be used for the negative electrode current collector of the conventional general lithium ion secondary cell can be used for the negative electrode current collector 22. For this reason, although the detailed description is omitted in the present specification, a copper foil having a thickness of 5 μm to 30 μm can be used as a specific example of the negative electrode current collector 22.

(2) Negative Electrode Mixture Layer

The negative electrode mixture layer 24 of the lithium ion secondary cell includes a negative electrode active material and other additives. The negative electrode mixture layer 24 is formed by coating a negative electrode mixture paste in which a negative electrode active material or an additive is dispersed on the surface (preferably both surfaces) of the negative electrode current collector 22 and drying the paste. In addition to the negative electrode active material and additives, ion exchange particles are added to the negative electrode mixture layer 24 of the negative electrode 20 according to the present embodiment. Each material contained in the negative electrode mixture layer will be described below.

(a) Negative Electrode Active Material

The negative electrode active material is a granular material capable of occluding and releasing lithium ions. The material of the negative electrode active material is not particularly limited, and various materials usable as a negative electrode active material for a lithium ion secondary cell may be used singly or in combination of two or more thereof (mixed or complexed). Preferable examples of the negative electrode active material include carbon materials such as graphite, non-graphitizable carbon (hard carbon), easily graphitized carbon (soft carbon), carbon nanotubes, or materials having a combination structure thereof. From the viewpoint of energy density, among them, graphite-based materials (natural graphite (stone graphite), artificial graphite, and the like) can be preferably used.

The content of the negative electrode active material is preferably set within the range of 90 wt % to 99.5 wt % (preferably 95 wt % to 99 wt %, for example, 98 wt %) when the entire negative electrode mixture layer is taken as 100 wt %.

(b) Additives

Examples of additives that can be included in the negative electrode mixture layer include a binder and a thickener. Examples of the binder include various polymer materials such as polyvinylidene fluoride (PVDF), polyvinylidene chloride (PVDC), styrene butadiene rubber (SBR), polytetrafluoroethylene (PTFE), polyethylene (PE), polyacrylic acid (PAA), and the like. Carboxymethyl cellulose (CMC), methyl cellulose (MC), or the like can be suitably used as the thickener.

Further, the content of the additive is preferably set within the range of 0.5 wt % to 10 wt % (preferably 1 wt % to 5 wt %, for example, 2 wt %) when the entire negative electrode mixture layer is taken as 100 wt %.

(c) Ion Exchange Particles

In the negative electrode according to the present embodiment, ion exchange particles are included in the negative electrode mixture layer. FIG. 1 is a diagram schematically showing ion exchange particles used in the negative electrode according to the present embodiment.

As shown in FIG. 1, the ion exchange particle 1 has ion exchange capacity to adsorb a transition metal ion such as $Mn^{2+}$, $Ni^{2+}$ and $Co^{2+}$ and release a predetermined cation. For example, zeolite, kaolinite, halloysite, illite, montmorillonite and the like can be preferably used as such ion exchange particle 1. Since these mineral materials have a suitable ion exchange capacity, it is possible to adequately adsorb the transition metal ions eluted from the positive electrode active material and to adequately release the cations. Among these mineral materials, zeolites are particularly preferably used because zeolites can be obtained at low cost and have an advantageous ion exchange capacity.

In the present embodiment, at least one of gold (Au) and platinum (Pt) is present in the ion exchange particle 1 described above. In other words, the ion exchange particle in the present embodiment has at least one of Au and Pt as a non-skeletal element, and when the aforementioned transition metal ion ($Mn^{2+}$, $Ni^{2+}$, $Co^{2+}$ or the like) is adsorbed, cations of Au (or Pt) can be released.

The ion exchange particle 1 in which at least one of Au and Pt is present can be obtained by subjecting the above-mentioned ion exchange particles such as zeolite, kaolinite, halloysite, illite, and montmorillonite to ion exchange treatment and replacing the non-skeletal element with Au (or Pt). For example, when a Na-substituted zeolite is used as the ion exchange particles, Au (or Pt) is adsorbed on such zeolite to release Na cations. As a result, a zeolite having Au (or Pt) as a non-skeletal element can be obtained.

In the negative electrode according to the present embodiment, formation of a dendritic Li metal can be suppressed by adding an adequate amount of ion exchange particles to the negative electrode mixture layer (this will be described hereinbelow in greater detail). Regarding the amount of ion exchange particles to be added at this time, when the solid fraction weight of the negative electrode mixture layer excluding the ion exchange particles (for example, the total weight of the negative electrode active material and the additive) is taken as 100 wt %, the amount of ion exchange particles is preferably adjusted to 1 wt % to 10 wt %, more preferably adjusted to 2.5 wt % to 7.5 wt %, for example, adjusted to 5 wt %.

(3) Precipitation of Li Metal

By constructing a lithium ion secondary cell by using the negative electrode according to the present embodiment, generation of a dendritic Li metal can be prevented, and a reduction in cell capacity can be suitably suppressed. This will be described more specifically hereinbelow with reference to FIGS. 2A to 2D.

Figure 2A:
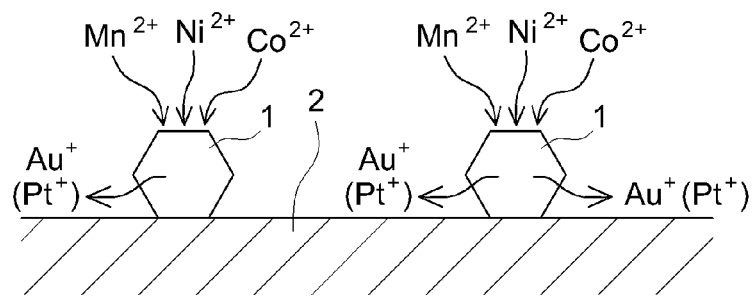
FIG. 2A is a diagram for explaining the adsorption of transition metal ions in a negative electrode for a lithium ion secondary cell according to one embodiment of the present invention.
Figure 2B:
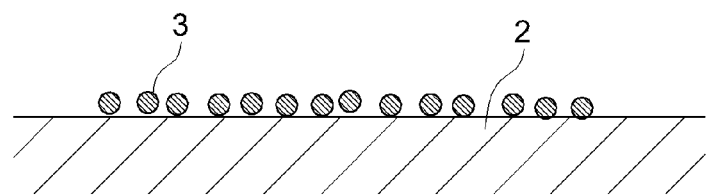
FIG. 2B is a diagram for explaining the formation of metal nanoparticles in a negative electrode for a lithium ion secondary cell according to one embodiment of the present invention.
Figure 2C:
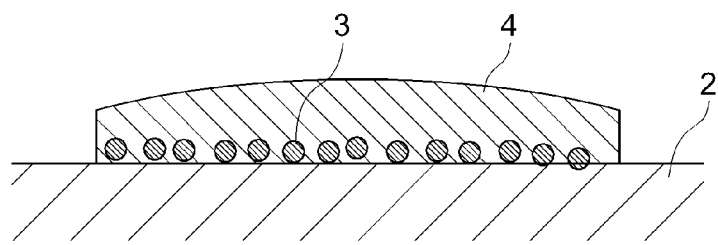
FIG. 2C is a diagram for explaining the growth of Li metal in a negative electrode for a lithium ion secondary cell according to one embodiment of the present invention.
Figure 2D:
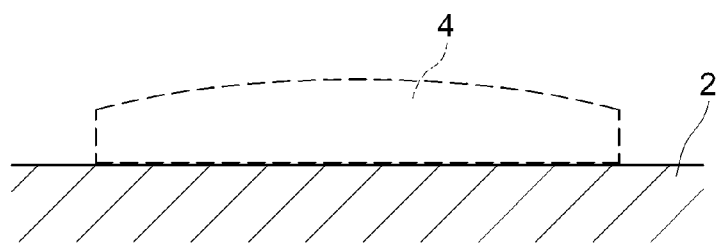
FIG. 2D is a diagram for explaining the dissolution of Li metal in a negative electrode for a lithium ion secondary cell according to one embodiment of the present invention.

FIG. 2A is a diagram for explaining the adsorption of transition metal ions in a negative electrode for a lithium ion secondary cell according to the present embodiment, and FIG. 2B is a diagram for explaining the formation of metal nanoparticles. Further, FIG. 2C is a diagram for explaining the growth of Li metal, and FIG. 2D is a view for explaining the dissolution of Li metal.

As described above, the negative electrode mixture layer of the negative electrode according to the present embodiment includes the negative electrode active material 2 and the ion exchange particles 1 (see FIG. 2A). In the lithium ion secondary cell using such a negative electrode, when transition metal ions ($Mn^{2+}$, $Ni^{2+}$, $Co^{2+}$, and the like) are eluted from a positive electrode active material (not shown) during charging and discharging, these transition metal ions are adsorbed by the ion exchange particle 1. As a result, precipitation of transition metal on the surface of the negative electrode active material 2 can be suitably prevented.

Since Au (or Pt) is present as a non-skeletal element in the ion exchange particle 1 of the present embodiment, when transition metal ions are adsorbed, cations of Au (or Pt) are released. The released Au (or Pt) once dissolves in the electrolytic solution, but since Au (or Pt) has an underpotential precipitation action. Au (or Pt) precipitates at a nobler potential than lithium and is attached to the surface of the negative electrode active material 2 as a large number of fine nanosize particles (metal nanoparticles 3) as shown in FIG. 2B.

Further, in the present embodiment, Li metal is precipitated on the Au (or Pt) metal nanoparticle 3 at a nobler potential than usual, and portions of Li metal grow while being bonded to each other, with the metal nanoparticles 3 serving as metal nuclei. As a result, a layered Li metal 4 as shown in FIG. 2C is formed on the surface of the negative electrode active material 2.

Figure 5A:
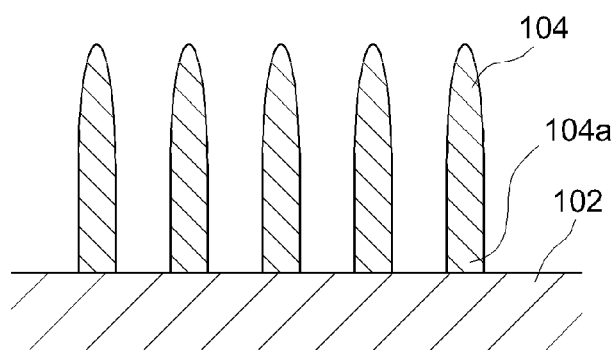
FIG. 5A is a diagram for explaining the precipitation of Li metal in a negative electrode for a conventional lithium ion secondary cell.
Figure 5B:
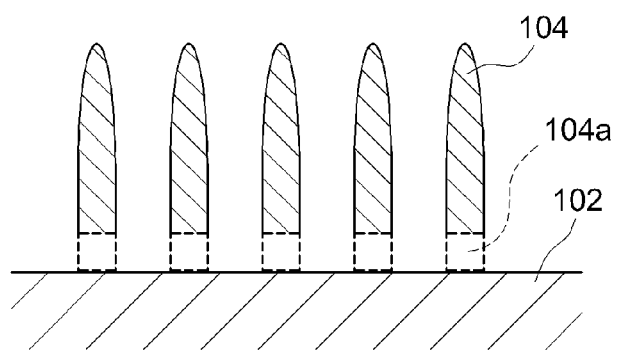
FIG. 5B is a view for explaining the dissolution of Li metal in a negative electrode for a conventional lithium ion secondary cell.

Since such layered Li metal 4 is conductively connected to the negative electrode active material 2 over a wide range, the Li metal can be easily dissolved, unlike the dendritic Li metal (see FIGS. 5A and 5B), in an electrolytic solution when discharge is performed or the cell is allowed to stand for a long time (see FIG. 2D).

As described above, in the negative electrode according to the present embodiment, ion exchange particles 1 in which at least one of gold (Au) and platinum (Pt) is present are included in the negative electrode mixture layer 1. Therefore, by constructing a lithium ion secondary cell by using such a negative electrode, it is possible to attach a large number of metal nanoparticles 3 including Au (or Pt) to the surface of the negative electrode active material 2. As a result, it is possible to prevent the formation of dendritic Li metal and suitably form the layered Li metal 4, so that it is possible to suitably suppress a reduction in cell capacity.

There are various techniques for attaching Au (or Pt) to the surface of the negative electrode active material, but according to the present embodiment, Au (or Pt) metal nanoparticles are attached to the surface of the negative electrode active material to prevent the generation of dendritic Li metal by a technique that is more efficient and easier to implement than other techniques.

Specifically, a technique for attaching Au (or Pt) to the surface of the negative electrode active material can be exemplified by coating Au (or Pt) by vapor deposition or plating treatment. However, with such a technique, not only the increase in the number of production steps decreases the production efficiency, but it is also difficult to form metal nanoparticles such that can suitably prevent the generation of dendritic Li metal.

As another technique for attaching Au (or Pt), a technique of adding an Au salt (or Pt salt) to an electrolytic solution can also be considered. However, depending on the added Au salt (or Pt salt), cell performance can be deteriorated. Further, similarly to the above method, it is difficult to form a plurality of suitable metal nanoparticles.

In contrast to these methods, according to the present embodiment, it is possible to attach a large number of suitable metal nanoparticles to the surface of the negative electrode active material without causing an increase in the number of process steps or a decrease in cell performance. As a result, generation of dendritic Li metal can be prevented easily and efficiently.

The average particle diameter of the ion exchange particles included in the negative electrode mixture layer is preferably 50 nm or more and 300 nm or less, and more preferably from 75 nm to 150 nm. By using such nanosize ion exchange particles, it is possible to increase the surface area of all the ion exchange particles included in the negative electrode mixture layer. As a result, transition metal ions eluted from the positive electrode active material can be suitably adsorbed and metal nanoparticles of Au (or Pt) having a sufficiently small particle diameter can be suitably formed.

Further, as shown in FIG. 2A, the ion exchange particles 1 are preferably supported on the surface of the negative electrode active material 2. Where the ion exchange particles are disposed at positions distant from the surface of the negative electrode active material, when the Au (or Pt) particles precipitate, the particles are unlikely to be uniformly attached to the surface of the negative electrode active material, and agglomerates and dendrites may be formed.

By contrast, where the ion exchange particles 1 are supported on the surface of the negative electrode active material 2, as shown in FIG. 2A, the ion exchange particles 1 can be arranged at positions close to the surface of the negative electrode active material 2. Therefore, the metal nanoparticles 3 (see FIG. 2B) derived from the cations of Au (or Pt) released from the ion exchange particles 1 can be suitably attached to the surface of the negative electrode active material 2.

However, the ion exchange particles are not necessarily supported on the negative electrode active material, and a negative electrode mixture layer in which ion exchange particles and a negative electrode active material are simply mixed can also be used.

2. Lithium Ion Secondary Cell

Figure 3:
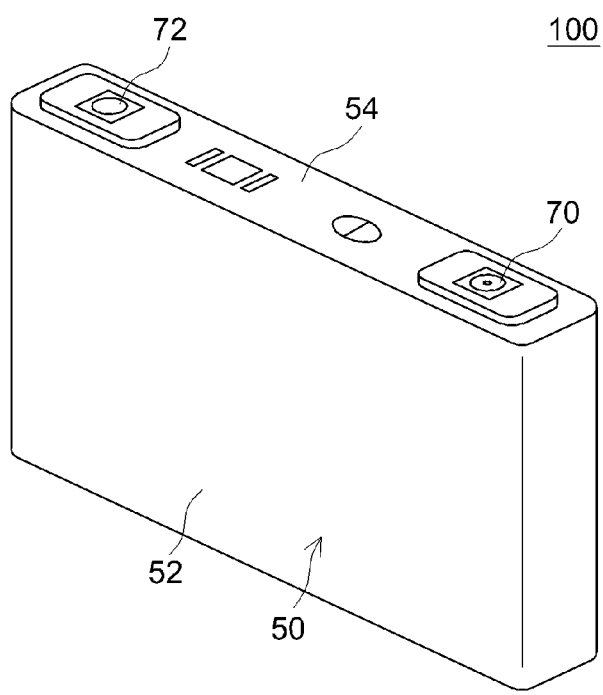
FIG. 3 is a perspective view schematically showing the outer shape of a lithium ion secondary cell according to another embodiment of the present invention.

Next, a lithium ion secondary cell will be described as another embodiment of the present invention. In the lithium ion secondary cell described in the present embodiment, the negative electrode according to the above-described embodiment is used. FIG. 3 is a perspective view schematically showing the lithium ion secondary cell according to the present embodiment.

As shown in FIG. 3, the lithium ion secondary cell 100 is configured by accommodating an electrode body (not shown) in an angular case 50.

(1) Case

The case 50 is composed of a flat case main body 52 which is opened at the upper end and a lid body 54 which closes the upper end of the case main body. The lid body 54 is provided with a positive electrode terminal 70 and a negative electrode terminal 72. Although it is not shown, the positive electrode terminal 70 is electrically connected to the positive electrode of the electrode body in the case 50, and the negative electrode terminal 72 is electrically connected to the negative electrode.

(2) Electrode Body

Figure 4:
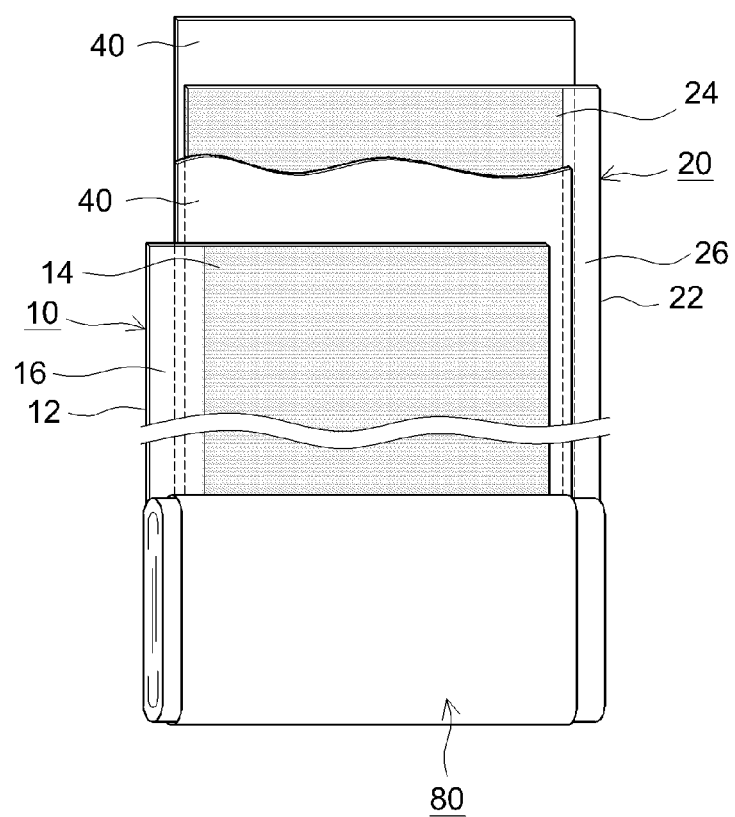
FIG. 4 is a perspective view schematically showing an electrode body of a lithium ion secondary cell according to another embodiment of the present invention.

Next, the structure of the electrode body accommodated in the case 50 will be described. FIG. 4 is a perspective view schematically showing the electrode body of the lithium ion secondary cell according to the present embodiment.

As shown in FIG. 4, the electrode body 80 in the present embodiment is a flat wound electrode body prepared by laminating long sheet-shaped positive electrode 10 and negative electrode 20 together with a long sheet-shaped separator 40 and winding the laminate.

(a) Positive Electrode

The positive electrode 10 in FIG. 4 is formed by coating a positive electrode mixture layer 14 on both sides of an elongated foil-shaped positive electrode current collector 12. A positive electrode mixture layer non-formation portion 16 not coated with the positive electrode mixture layer 14 is formed on one side edge portion in the width direction of the positive electrode 10, and the positive electrode mixture layer non-formation portion 16 is electrically connected to the positive electrode terminal 70 (see FIG. 3).

In the lithium ion secondary cell 100 according to the present embodiment, a lithium transition metal complex oxide is used as the positive electrode active material included in the positive electrode mixture layer 14. The lithium transition metal complex oxide includes a lithium element and one or two or more transition metal elements. Specific examples of such a lithium transition metal complex oxide include a lithium-nickel-based complex oxide (for example, $LiNiO_2$), a lithium-cobalt-based complex oxide (for example, $LiCoO_2$), a lithium-manganese-based complex oxide (for example, $LiMn_2O_4$), a lithium-nickel-manganese-based complex oxide (for example, $LiNi_{0.5}Mn_{1.5}O_4$), a lithium-nickel-cobalt-manganese-based complex oxide (for example, $LiNi_{1/3}Co_{1/3}Mn_{1/3}O_2$), and the like. A polyanion-based (for example, an olivine-based) compound represented by a general formula of $LiMPO_4$ (where M is at least one transition metal element selected from Co, Ni, Mn, and Fe), for example, $LiFePO_4$ and $LiMnPO_4$ can also be used as the lithium transition metal complex oxide.

The "lithium-nickel-cobalt-manganese-based complex oxide" in this specification is inclusive of not only oxides having Li, Ni, Co. and Mn as constituent metal elements, but also of oxides including one or more kinds of metal elements other than Li. Ni, Co, and Mn. Examples of the metal elements other than Li, Ni, Co and Mn include transition metal elements other than Ni, Co, and Mn and/or typical metal elements (for example, Al, Ca, Cr, Fe, V, Mg, Ti, Zr, Nb, Mo, W, Cu, Zn, Ga, In, Sn, La, Ce) and the like. Likewise, the "lithium-nickel-based complex oxide", "lithium-cobalt-based complex oxide", "lithium-manganese-based complex oxide", and "polyanion-based compound" are also inclusive of oxides including one or more kinds of other metal elements.

In addition, the positive electrode mixture layer 14 may include additives other than the above-described positive electrode active material. Examples of such additives include conductive additives. A carbonaceous material such as carbon powder or carbon fiber is preferably used as the conductive additive, but a conductive metal powder such as nickel powder or the like can also be used.

Other additives include binders (binding agents) and the like. For the binder for the positive electrode mixture layer 14, it is possible to use the same kind of polymer material as the above-mentioned binder for the negative electrode mixture layer.

(b) Negative Electrode

In the negative electrode 20 shown in FIG. 4, a negative electrode mixture layer 24 is formed on both sides of an elongated foil-shaped negative electrode current collector 22. Further, a negative electrode mixture layer non-formation portion 26 is formed on one side edge portion in the width direction of the negative electrode 20, and the negative electrode mixture layer non-formation portion 26 is electrically connected to the negative electrode terminal 72 (see FIG. 3).

The negative electrode according to the above-described embodiment is used for the negative electrode 20 of the lithium ion secondary cell 100 according to the present embodiment. Explanation of the detailed configuration is omitted herein because this configuration was described in the above embodiment. Ion exchange particles are included in the negative electrode mixture layer 24 of the negative electrode 20, and ion exchange particles 1 (see FIG. 1) including Au (or Pt) as a non-skeleton element are used as the ion exchange particles.

Therefore, in the lithium ion secondary cell 100 according to the present embodiment, as shown in FIG. 2C, a plurality of metal nanoparticles 3 derived from cations of Au (or Pt) released from the ion exchange particles 1 are attached to the surface of the negative electrode active material 2. As a result, when Li metal is precipitated during charging, the Li metal can be grown in a layer shape so as to cover the surface of the negative electrode active material 2, so that a reduction in cell capacity can be suitably suppressed.

The average particle diameter of such metal nanoparticles 3 is preferably 2 nm to 3 nm. Since a large number of such fine metal nanoparticles 3 are attached to the surface of the negative electrode active material 2, it is possible to easily form the layered Li metal 4 as shown in FIG. 2C, so that the generation of dendritic Li metal can be suitably prevented and a reduction in cell capacity can be further suitably suppressed.

In the lithium ion secondary cell using the negative electrode according to the above-described embodiment, cations of Au (or Pt) are released from the ion exchange particles 1, and the metal nanoparticles 3 derived from the cations are formed on the surface of the negative electrode active material 2. However, it is not necessary that all of Au (or Pt) contained in the ion exchange particles 1 be released, and some Au (or Pt) may be present in the ion exchange particles 1.

(c) Separator

The separator 40 is arranged so as to be interposed between the positive electrode 10 and the negative electrode 20 described above. In this separator 40, a strip-shaped sheet material having a predetermined width and a plurality of minute holes is used. For example, a sheet material having a monolayer structure composed of a porous polyolefin resin or a sheet material having a laminated structure can be used. Further, a layer (filler layer) of particles having insulating properties may be further formed on the surface of such a sheet material. Examples of the particles having insulating properties include inorganic fillers having insulating properties (for example, a filler such as a metal oxide, a metal hydroxide or the like) and resin particles having insulating properties (for example, particles of polyethylene, polypropylene or the like).

(3) Electrolytic Solution

The same nonaqueous electrolytic solutions as those conventionally used for a lithium ion secondary cell can be used without particular limitation as the electrolytic solution (nonaqueous electrolytic solution). Such a nonaqueous electrolytic solution is typically formed by including a supporting salt in a nonaqueous solvent.

Examples of the nonaqueous solvent include one or two or more elements selected from the group consisting of ethylene carbonate, propylene carbonate, dimethyl carbonate, diethyl carbonate, ethylmethyl carbonate, 1,2-dimethoxyethane, 1,2-diethoxyethane, tetrahydrofuran, 1,3-dioxolane.

As the supporting salt, for example, lithium salts such as $LiPF_6$, $LiBF_4$, $LiAsF_6$, $LiCF_3SO_3$, $LiC_4F_9SO_3$, $LiN(CF_3SO_2)_2$, $LiC(CF_3SO_2)_3$ or the like can be used.

The lithium ion secondary cell 100 according to the present embodiment is composed of the above-described materials. Further, the lithium ion secondary cell 100 uses the negative electrode 20 in which the ion exchange particles 1 with Au (or Pt) present therein are included in the negative electrode mixture layer 24. As a result, a plurality of metal nanoparticles 3 derived from cations of Au (or Pt) released from the ion exchange particles 1 are attached to the surface of the negative electrode active material 2.

Therefore, the formation of dendritic Li metal on the surface of the negative electrode active material during charging can be prevented, and a reduction in cell capacity can be suitably suppressed.

3. Method for Producing Lithium Ion Secondary Cell

Next, a method for producing a lithium ion secondary cell by preparing a negative electrode according to the above-described embodiment and using the produced negative electrode will be described. This production method includes a paste preparation step, a negative electrode preparation step, a sealing step, and a metal nanoparticle formation step.

(1) Paste Preparation Step

In the paste preparation step, a negative electrode mixture paste including a negative electrode active material and ion exchange particles in which at least one of gold (Au) and platinum (Pt) is present is prepared. Specifically, a negative electrode mixture paste is prepared by dispersing the above-mentioned solid material (negative electrode active material, additive, ion exchange particle) in a predetermined solvent (for example, water or N-methyl pyrrolidone). When the solid material is dispersed in the solvent, a general kneading machine used for preparing a negative electrode mixture paste can be used.

At this time, it is preferable to mix the ion exchange particles and the negative electrode active material in advance and subject the mixed powder to ball mill treatment. By carrying out such ball mill treatment, as shown in FIG. 2A, since the ion exchange particles 1 can be supported on the surface of the negative electrode active material 2, it is possible to easily attach the metal nanoparticles to the surface of the negative electrode active material 2.

(2) Negative Electrode Preparation Step

In the negative electrode preparation step, the negative electrode mixture paste is coated on the surface of a negative electrode current collector, and the paste is dried. As a result, a negative electrode in which a negative electrode mixture layer is formed on the surface of the negative electrode current collector can be prepared.

When the negative electrode mixture paste is coated on the negative electrode current collector 22, the coating can be performed using various known coating apparatuses. For example, the paste can be coated on one side or both sides of the negative electrode current collector 22 by using a coater. Any coater can be used as long as it can coat the negative electrode mixture paste on the negative electrode current collector 22. For example, a slit coater, a die coater, a gravure coater, a roll coater, a coater using a doctor blade, a comma coater or the like can be used.

In addition, the temperature at the time of drying the negative electrode mixture paste is desirably set to be equal to or lower than the melting point of the binder, and is set to about 50° C. to 175° C. (preferably 70° C. to 150° C.).

(3) Sealing Step

Here, the negative electrode and the positive electrode are accommodated in a case together with a predetermined electrolytic solution and the case is sealed. Specifically, the prepared negative electrode 20 and positive electrode 10 are laminated with the separator 40 interposed therebetween, and the laminate is wound so that the electrode body 80 as shown in FIG. 4 is produced. Then, the electrode body 80 is accommodated in the case 50 (see FIG. 3) together with the electrolytic solution, and the case 50 is tightly closed.

(4) Metal Nanoparticle Formation Step

In the method for producing a lithium ion secondary cell according to the present embodiment, after the case 50 is sealed, a metal nanoparticle formation step of forming the metal nanoparticles 3 on the surface of the negative electrode active material 2 is performed.

In the metal nanoparticle formation step, cations of at least one of gold (Au) and platinum (Pt) are caused to be released from the ion exchange particles 1 of the negative electrode mixture layer 24, whereby the metal nanoparticles 3 derived from the cations are attached. One of the means for implementing the release of such cations is initial charging. Specifically, when the case 50 accommodating the electrode body 80 is sealed and then initial charging is performed, transition metal ions are eluted from the positive electrode active material. As described above, the ion exchange particles included in the negative electrode mixture layer adsorb the transition metal ions and release cations of Au (or Pt). As a result, metal nanoparticles derived from the released cations are formed, and a large number of the metal nanoparticles are attached to the surface of the negative electrode active material.

At this time, it is preferable to perform aging treatment at a temperature of 50° C. to 70° C. in a fully charged state. By performing aging treatment in such a high temperature environment, it is possible to cause the elution of a suitable amount of transition metal ions from the positive electrode active material and to cause the adsorption of the eluted ions onto the ion exchange particles. As a result, since cations of Au (or Pt) can be adequately released from the ion exchange particles, metal nanoparticles derived from the cations can be suitably precipitated on the surface of the negative electrode active material, and the formation of dendritic Li metal can be more suitably prevented.

TEST EXAMPLES

Hereinafter, test examples relating to the present invention will be described, but the description of the test examples is not intended to limit the present invention.

1. Test Examples (1) Test Example 1

In Test Example 1, a lithium ion secondary cell was produced without adding ion exchange particles to the negative electrode mixture layer.

Specifically, first, a positive electrode active material ($LiNi_{1/3}Co_{1/3}Mn_{1/3}O_2$), a conductive material (acetylene black), and a binder (PVDF) were mixed at a ratio of 90:8:2 and dispersed in a dispersion medium (NMP: N-methylpyrrolidone) to prepare a positive electrode mixture paste. Then, the positive electrode mixture paste was coated on both surfaces of a positive electrode current collector (aluminum foil), and then dried and rolled to prepare a sheet-shaped positive electrode. The coating amount (weight per unit area) of the positive electrode mixture paste on one side of the positive electrode current collector was set to 6 $mg/cm^2$ (12 $mg/cm^2$ on both sides).

Next, in the present test example, a negative electrode active material (graphite) and a binder (PVDF) were mixed at a ratio of 98:2 and dispersed in a dispersion medium (NMP) to prepare a negative electrode mixture paste. Then, this paste was coated on both sides of the negative electrode current collector (copper foil), and then dried and rolled to prepare a sheet-shaped negative electrode. The coating amount (weight per unit area) of the negative electrode mixture paste on one side of the negative electrode current collector was set to 3 $mg/cm^2$ (6 $mg/cm^2$ on both sides).

In the present test example, a filler layer was formed on the surface of the separator. Specifically, an inorganic filler (alumina), an acrylic polymer and CMC were mixed at a ratio of 95:2.5:2.5 and dispersed in a dispersion medium (water) to prepare a filler layer paste. Then, the filler layer paste was coated on one side of the separator with a weight per unit area of 0.75 $mg/cm^2$ and dried to form a filler layer on the surface of the separator. The separator used in the present test example was a three-layered separator in which a PE layer was sandwiched between two PP layers.

Next, the positive electrode and the negative electrode prepared as described above were laminated with a sheet-shaped separator interposed therebetween, and the laminate was then wound to prepare a flat wound electrode body. Then, the prepared wound electrode body was connected to electrode terminals (positive electrode terminal and negative electrode terminal) and then placed in a case together with an electrolytic solution. The case was then sealed to construct a lithium ion secondary cell (Test Example 1) for evaluation tests. A nonaqueous electrolytic solution including LiPF$_6$ as a supporting salt at a concentration of about 1 mol/liter in a mixed solvent including EC, EMC, and DMC at a volume ratio of 3:3:4 was used as the electrolytic solution.

(2) Test Example 2

In Test Example 2, a lithium ion secondary cell for evaluation tests was constructed under the same conditions as in Test Example 1, except that ion exchange particles were added to the negative electrode mixture layer. Specifically, in Test Example 2, Na-substituted zeolite powder having an average particle diameter of 1 μm (1000 nm) was used as ion exchange particles. Then, the addition amount of the Na-substituted zeolite powder was set to 5 wt % with the total weight of the negative electrode active material and the binder being 100 wt %, and a negative electrode was prepared by using the negative electrode mixture paste including the Na-substituted zeolite powder.

(3) Test Examples 3 and 4

In Test Examples 3 and 4, lithium ion secondary cells for evaluation tests were constructed under the same conditions as in Test Example 2, except that ion exchange particles having different average particle diameter were used. Specifically, Na-substituted zeolite powder having an average particle diameter of 300 nm was used in Test Example 3, and Na-substituted zeolite powder having an average particle diameter of 50 nm was used in Test Example 4.

(4) Test Examples 5 to 7

In Test Examples 5 to 7, lithium ion secondary cells for evaluation tests were constructed under the same conditions as in Test Examples 2 to 4, except that ion exchange particles (Na-substituted zeolite powder) were supported on the surface of the negative electrode active material. Specifically, in Test Examples 5 to 7, the Na-substituted zeolite and the negative electrode active material were mixed in advance and complexing treatment was performed for 10 min by using a ball mill. The average particle diameter of the zeolite was 1 μm in Test Example 5, 300 nm in Test Example 6, and 50 nm in Test Example 7.

(5) Test Examples 8 to 10

In Test Examples 8 to 10, lithium ion secondary cells for evaluation tests were constructed under the same conditions as in Test Examples 2 to 4, except that a zeolite including Au as a non-skeletal element was used as ion exchange particles. Thus, in Test Examples 8 to 10, a Na-substituted zeolite similar to that of the above-described Test Examples was prepared, and ion exchange treatment was performed to replace 70% of Na in the Na-substituted zeolite with Au. The average particle diameter of the zeolite was 1 μm in Test Example 8, 300 nm in Test Example 9, and 50 nm in Test Example 10.

(6) Test Examples 11 to 13

In Test Examples 11 to 13, lithium ion secondary cells for evaluation tests were constructed under the same conditions as in Test Examples 5 to 7, except that a zeolite including Au as a non-skeletal element was used as ion exchange particles. That is, similarly to Test Examples 8 to 10 described above, a 70% Au-substituted zeolite obtained by ion exchange treatment was added to a negative electrode paste and then complexing treatment was performed for 10 min by using a ball mill to support the zeolite on the negative electrode active material. The average particle diameter of the zeolite was 1 μm in Test Example 11, 300 nm in Test Example 12, and 50 nm in Test Example 13.

(7) Test Example 14

In Test Example 14, a lithium ion secondary cell for evaluation tests was constructed under the same conditions as in Test Example 13, except that ion exchange particles were added to the positive electrode mixture layer. Here, a 70%/o Au-substituted zeolite (average particle diameter: 50 nm) was used as ion exchange particles, and the zeolite was added to the positive electrode paste to prepare a positive electrode. In Test Example 14, the 70% Au-substituted zeolite was added at 2.5 wt % with respect to 100 wt % of the solid fraction of the positive electrode mixture paste.

(8) Test Example 15

In Test Example 15, a lithium ion secondary cell for evaluation tests was constructed under the same conditions as in Test Example 13, except that ion exchange particles were added to the filler layer of the separator. That is, in Test Example 15, a 70% Au-substituted zeolite (average particle diameter: 50 nm) was used as ion exchange particles, the zeolite was added to the filler layer paste, and the filler layer paste was used to form a filler layer on the surface of the separator. In Test Example 14, the 70% Au-substituted zeolite was added so that the weight per unit area when coated on the separator was 0.15 mg/cm$^2$.

Characteristics of the lithium ion secondary cells of Test Examples 1 to 15 described above are summarized in the following Table 1.

TABLE 1

| | Positive electrode | | | | Filler layer | | | |
|---|---|---|---|---|---|---|---|---|
| | Ratio of zeolite (wt %) | Zeolite particle diameter (nm) | Amount coated on one side (mg/cm$^2$) | Zeolite amount (mg/cm$^2$) | Ratio of zeolite (wt %) | Weight per unit area (mg/cm$^2$) | Zeolite amount (mg/cm$^2$) | Zeolite particle diameter (nm) |
| Test Example 1 | 0 | — | 6 | 0 | 0 | 0.75 | 0 | — |
| Test Example 2 | 0 | — | 6 | 0 | 0 | 0.75 | 0 | — |
| Test Example 3 | 0 | — | 6 | 0 | 0 | 0.75 | 0 | — |
| Test Example 4 | 0 | — | 6 | 0 | 0 | 0.75 | 0 | — |
| Test Example 5 | 0 | — | 6 | 0 | 0 | 0.75 | 0 | — |
| Test Example 6 | 0 | — | 6 | 0 | 0 | 0.75 | 0 | — |

TABLE 1-continued

| | | | | | | | | |
|---|---|---|---|---|---|---|---|---|
| Test Example 7 | 0 | — | 6 | 0 | 0 | 0.75 | 0 | — |
| Test Example 8 | 0 | — | 6 | 0 | 0 | 0.75 | 0 | — |
| Test example 9 | 0 | — | 6 | 0 | 0 | 0.75 | 0 | — |
| Test Example 10 | 0 | — | 6 | 0 | 0 | 0.75 | 0 | — |
| Test Example 11 | 0 | — | 6 | 0 | 0 | 0.75 | 0 | — |
| Test Example 12 | 0 | — | 6 | 0 | 0 | 0.75 | 0 | — |
| Test Example 13 | 0 | — | 6 | 0 | 0 | 0.75 | 0 | — |
| Test Example 14 | 2.5 (Au) | 50 | 6.15 | 0.15 | 0 | 0.75 | 0 | 0 |
| Test Example 15 | 0 | — | 6 | 0 | 20 (Au) | 0.75 | 0.15 | 50 |

| | Negative electrode | | | | |
|---|---|---|---|---|---|
| | Ratio of zeolite (wt %) | Zeolite particle diameter (nm) | Amount coated on one side (mg/cm$^2$) | Zeolite amount (mg/cm$^2$) | Zeolite addition |
| Test Example 1 | 0 | — | 3 | 0 | — |
| Test Example 2 | 5 (Na) | 1000 | 3.15 | 0.15 | Mixing |
| Test Example 3 | 5 (Na) | 300 | 3.15 | 0.15 | Mixing |
| Test Example 4 | 5 (Na) | 50 | 3.15 | 0.15 | Mixing |
| Test Example 5 | 5 (Na) | 1000 | 3.15 | 0.15 | Supporting |
| Test Example 6 | 5 (Na) | 300 | 3.15 | 0.15 | Supporting |
| Test Example 7 | 5 (Na) | 50 | 3.15 | 0.15 | Supporting |
| Test Example 8 | 5 (Au) | 1000 | 3.15 | 0.15 | Mixing |
| Test example 9 | 5 (Au) | 300 | 3.15 | 0.15 | Mixing |
| Test Example 10 | 5 (Au) | 50 | 3.15 | 0.15 | Mixing |
| Test Example 11 | 5 (Au) | 1000 | 3.15 | 0.15 | Supporting |
| Test Example 12 | 5 (Au) | 300 | 3.15 | 0.15 | Supporting |
| Test Example 13 | 5 (Au) | 50 | 3.15 | 0.15 | Supporting |
| Test Example 14 | 0 | — | 3 | 0 | — |
| Test Example 15 | 0 | — | 3 | 0 | — |

2. Evaluation Tests

Next, in the test examples, the lithium ion secondary cells of Test Examples 1 to 15 were subjected to evaluation tests to evaluate the resistance to Li metal precipitation. Specifically, as an index of the resistance to Li metal precipitation, a critical current value immediately after the preparation of the cell (initial critical current value) and a critical current value after a high-temperature durability test (post-durability-test critical current value) were measured. Each evaluation test will be specifically described below.

(1) Initial Critical Current Value

In the present test, the lithium ion secondary cells prepared in Test Examples 1 to 15 were subjected to 1000 charge/discharge cycles, each cycle including charging for 5 sec in an environment of −10° C., allowing to stand for 10 min, then discharging for 5 sec and allowing to stand for 10 min. The cells after 1000 cycles were disassembled, and the surface of the negative electrode active material was observed.

Further, in the present evaluation test, a plurality of lithium ion secondary cells were prepared in each test example, and charge/discharge cycles with different current values were performed for each cell. Then, among the cells in which Li metal did not precipitate on the surface of the negative electrode active material (Li metal was suitably dissolved by discharging), the cell with the highest current value was examined and the current value of this cell was taken as the critical current value (initial critical current value). The measurement results are shown in Table 2. In Table 2, the measurement result of each test example is shown as the ratio in the case where the measurement result of the initial critical current value of Test Example 1 is taken as 100%.

(2) Post-Durability-Test Critical Current Value

In the present test, first, the lithium ion secondary cells prepared in each test example were subjected to a durability test in which the cells were stored for 60 days in a high temperature environment (75° C.). With respect to each cell after the durability test, the critical current value was measured by the same procedure as the abovementioned initial critical current value and evaluated as the post-durability-test critical current value. The results are shown in Table 2. In Table 2, the measurement result of each test example is shown as the ratio in the case where the measurement result of the post-durability-test critical current value of Test Example 1 is taken as 100%.

TABLE 2

| | Critical current value | |
|---|---|---|
| | Initial (%) | Post-durability-test (%) |
| Test example 1 | 100 | 100 |
| Test example 2 | 98 | 99 |
| Test example 3 | 97 | 98 |
| Test example 4 | 97 | 98 |
| Test example 5 | 97 | 98 |
| Test example 6 | 95 | 96 |
| Test example 7 | 94 | 95 |
| Test example 8 | 100 | 100 |
| Test example 9 | 101 | 101 |
| Test example 10 | 103 | 102 |
| Test example 11 | 101 | 102 |
| Test example 12 | 106 | 108 |
| Test example 13 | 110 | 115 |
| Test example 14 | 99 | 99 |
| Test example 15 | 99 | 98 |

From the above test results, it was confirmed that where a zeolite is added to the negative electrode mixture layer, as in Test Examples 2 to 7, the critical current value of the lithium ion secondary cell is lowered. This is apparently because ion exchange particles such as a zeolite are an insulator, which reduces the electron conduction of the negative electrode active material, so that the Li metal attached to the negative electrode active material is not sufficiently decomposed.

Meanwhile, in Test Examples 8 to 13, as a result of using a zeolite including Au as a non-skeletal element, a suitable critical current value was obtained despite the addition of the zeolite which is an insulator. This is apparently because when the zeolite including Au as a non-skeletal element is added to the negative electrode mixture layer, Au ions are released from the zeolite, and a large number of metal nanoparticles derived from the released cations are attached to the surface of the negative electrode active material, thereby preventing the precipitation of dendritic Li metal and forming easily decomposable layered Li metal.

Among Test Examples 2 to 7, an especially preferable critical current value could be confirmed in Test Examples 12 and 13. From this, it has been found that the particle diameter of the zeolite is preferably 50 nm to 300 nm and also that it is more preferable to support the zeolite on the surface of the negative electrode active material.

In Test Example 14 in which a zeolite including Au as a non-skeletal element was added to the positive electrode mixture layer and in Test Example 15 in which the zeolite was added to the inorganic filler layer, the precipitation of dendritic Li metal could not be suppressed. This is because when ion exchange particles (zeolite) are added to the positive electrode mixture layer or the filler layer, the distance between the ion exchange particles and the negative electrode active material increases, so that Au metal nanoparticles cannot be anymore suitably attached to the surface of the negative electrode active material. From this result, it was understood that the ion exchange particles need to be added to the negative electrode mixture layer.

Although the present invention has been described in detail, the above-described embodiment is merely an example, and the invention disclosed herein is inclusive of various changes and modifications of the above-described specific examples.

What is claimed is:

1. A negative electrode for a lithium ion secondary cell, in which a negative electrode mixture layer including a negative electrode active material is formed on a surface of a foil-shaped negative electrode current collector, wherein
ion exchange particles that adsorb transition metal ions and release prescribed cations are included in the negative electrode mixture layer, and at least one of gold (Au) and platinum (Pt) is present in the ion exchange particles as a non-skeletal element.

2. The negative electrode for a lithium ion secondary cell according to claim 1, wherein the ion exchange particles are one or more selected from the group consisting of zeolite, kaolinite, halloysite, illite, and montmorillonite.

3. The negative electrode for a lithium ion secondary cell according to claim 1, wherein the ion exchange particles are supported on a surface of the negative electrode active material.

4. The negative electrode for a lithium ion secondary cell according to claim 1, wherein the ion exchange particles have an average particle diameter of 50 nm or more and 300 nm or less.

5. The negative electrode for a lithium ion secondary cell according to claim 1, wherein when the weight of the negative electrode mixture layer excluding the ion exchange particles is taken as 100 wt %, the weight of the ion exchange particles is 1 wt % to 10 wt %.

6. The negative electrode for a lithium ion secondary cell according to claim 1, wherein the ion exchange particles included in the negative electrode are obtained by subjecting ion exchange particles to an ion exchange treatment.

7. The negative electrode for a lithium ion secondary cell according to claim 6, wherein the ion exchange treatment replaces original non-skeletal elements of the ion exchange particles with Au or Pt.

8. The negative electrode for a lithium ion secondary cell according to claim 1, wherein the ion exchange particles included in the negative electrode are obtained by subjecting one or more selected from the group consisting of zeolite, kaolinite, halloysite, illite, and montmorillonite to an ion exchange treatment.

9. A lithium ion secondary cell comprising:
a positive electrode in which a positive electrode mixture layer including a positive electrode active material is formed on a surface of a foil-shaped positive electrode current collector; and
a negative electrode in which a negative electrode mixture layer including a negative electrode active material is formed on a surface of a foil-shaped negative electrode current collector, wherein
the positive electrode active material is a lithium transition metal complex oxide,
ion exchange particles that adsorb transition metal ions and release prescribed cations are included in the negative electrode mixture layer, and
a plurality of metal nanoparticles including at least one of gold (Au) and platinum (Pt) are attached to a surface of the negative electrode active material as a non-skeletal element.

10. The lithium ion secondary cell according to claim 9, wherein at least one of gold (Au) and platinum (Pt) is present in the ion exchange particles.

11. The lithium ion secondary cell according to claim 9, wherein the metal nanoparticles have an average particle diameter of 2 nm to 3 nm.

12. The lithium ion secondary cell according to claim 9, wherein the ion exchange particles included in the negative electrode are obtained by subjecting ion exchange particles to an ion exchange treatment.

13. The lithium ion secondary cell according to claim 12, wherein the ion exchange treatment replaces original non-skeletal elements of the ion exchange particles with Au or Pt.

14. The lithium ion secondary cell according to claim 9, wherein the ion exchange particles included in the negative electrode are obtained by subjecting one or more selected from the group consisting of zeolite, kaolinite, halloysite, illite, and montmorillonite to an ion exchange treatment.

15. A method for producing the lithium ion secondary cell according to claim 6, the method comprising:
a paste preparation step of preparing a negative electrode mixture paste including ion exchange particles in which at least one of gold (Au) and platinum (Pt) is present, and the negative electrode active material;
a negative electrode preparation step of preparing a negative electrode in which the negative electrode mixture layer is formed on the surface of the negative electrode current collector by coating the negative electrode mixture paste on the surface of the negative electrode current collector and drying the negative electrode mixture paste;
a sealing step of accommodating the negative electrode and the positive electrode together with a predetermined electrolytic solution in a case and sealing the case; and
a metal nanoparticle formation step of attaching a plurality of metal nanoparticles to a surface of the negative electrode active material by releasing cations of at least one of the gold (Au) and platinum (Pt) from the ion exchange particles included in the negative electrode mixture layer as a non-skeletal element.

16. The method for producing a lithium ion secondary cell according to claim 15, wherein, in the paste preparation step, the ion exchange particles are supported on the surface of the negative electrode active material by mixing the ion exchange particles and the negative electrode active material and subjecting the mixed material to ball mill treatment.

17. The method for producing a lithium ion secondary cell according to claim 15, wherein, in the metal nanoparticle formation step, a plurality of metal nanoparticles are attached to the surface of the negative electrode active material by performing aging treatment at a temperature of 50° C. to 70° C. in a fully charged state.

18. The method for producing a lithium ion secondary cell according to claim 15, wherein the ion exchange particles included in the negative electrode are obtained by subjecting ion exchange particles to an ion exchange treatment.

19. The method for producing a lithium ion secondary cell according to claim 18, wherein the ion exchange treatment replaces original non-skeletal elements of the ion exchange particles with Au or Pt.

20. The method for producing a lithium ion secondary cell according to claim 15, wherein the ion exchange particles included in the negative electrode are obtained by subjecting one or more selected from the group consisting of zeolite, kaolinite, halloysite, illite, and montmorillonite to an ion exchange treatment.

* * * * *